Oct. 30, 1962 J. J. SACCO, JR., ET AL 3,061,546

MAGNETIC CORES

Filed March 2, 1960

INVENTORS
JOSEPH J. SACCO, JR &
EUGENE G. FORTIN
BY W. S. Hill
AGENT 3,061,546
MAGNETIC CORES
Joseph J. Sacco, Jr., Natick, and Eugene G. Fortin, Hyde Park, Mass., assignors to Radio Corporation of America, a corporation of Delaware
Filed Mar. 2, 1960, Ser. No. 12,453
10 Claims. (Cl. 252—62.5)

This invention relates to improved magnetic ferrospinel cores and particularly to improved ceramic bodies of sintered metallic oxides having unexpected and useful square magnetic hysteresis loop properties and to methods of manufacture thereof.

The term "spinel" generally refers to a class of materials having the molar formula $M^{2+}(M^{3+})_2O_4$ and having a spinel crystal structure. $M^{2+}$ may be one or more divalent cations. $M^{3+}$ may be one or more trivalent cations. A "single spinel" is a spinel in which $M^{2+}$ is a single divalent cation and $M^{3+}$ in a single trivalent cation. A "mixed spinel" is a spinel in which either or both $M^{2+}$ comprises more than one divalent cation or $M^{3+}$ comprises more than one trivalent cation. A mixed spinel may also be defined as a single homogeneous material comprising two or more single spinels in a solid solution. The ferromagnetic spinels are also referred to as "ferrospinels." The term "ferrites" is most generally used to refer to sintered polycrystalline bodies or cores consisting essentially of spinel crystallites. The term "ferrites," however, includes also bodies of crystallites other than spinels.

Many magnetic cores of mixed ferrospinels exhibit highly non-linear magnetic hysteresis characteristics which are said to be "rectangular" loops or "square" loops. Upon applying a magnetic field, such a body or core assumes one of two definite identifiable stable states of remanent magnetization which are designated the "zero" and "one" states. The core can be changed or switched to the other stable state by applying thereto a reverse magnetic field greater than the coercive force of the core. Cores which require a relatively large magnetic field for switching from one state to the other are referred to as high drive cores. Cores which require relatively small magnetic fields for switching from one state to the other are referred to as low drive cores. Magnetic cores with substantially rectangular magnetic hysteresis characteristics are useful in shift registers, magnetic switching devices and in magnetic memory devices. When the core switches from one stable state to another, the change is monitored by a read out or sense winding around the core. The change appears as an output signal pulse in the sense winding. The magnitude of the signal should be as high as possible. A high signal is achieved by providing cores which exhibit a higher saturation flux density.

An object of this invention is to provide improved magnetic cores.

Another object is to provide improved methods for manufacturing magnetic cores of mixed ferrospinels.

A further object is to provide improved magnetic bodies of mixed spinels exhibiting highly rectangular magnetic hysteresis characteristics and a relatively high signal output upon switching.

In general, the improved magnetic cores herein each comprises a ferromagnetic ferrite body having a substantially square hysteresis loop formed by firing a mixture of magnesium, manganese, zinc, nickel and iron oxides in the proportions of about:

| | Mol percent |
|---|---|
| MgO | 15 to 25 |
| MnO | 10 to 40 |
| ZnO | 9 to 20 |
| NiO | 2 to 10 |
| $Fe_2O_3$ | 35 to 45 |

The improved mixed ferrospinel bodies of the invention may be prepared by first calcining in air at about 900 to 1100° C. an intimate physical mixture consisting essentially of the foregoing composition. The calcine is compacted to a coherent body, then sintered at about 1100 to 1300° C. in air, and finally annealed in a neutral atmosphere at about 1025 to 1100° C.

The invention is described in greater detail by reference to the accompanying drawings in which.

*Example.*—A magnetic core of the invention may be prepared by the following procedure. Mix and calcine in air for one hour at about 525° C. the following composition.

| | Mol percent |
|---|---|
| MgO, as magnesium carbonate, Mallinckrodt SL powder | 19.8 |
| MnO, as $MnCO_3$, Baker's analyzed reagent grade | 16.2 |
| ZnO, Baker's analyzed reagent grade | 15.0 |
| NiO, Baker's analyzed reagent grade | 7.5 |
| $Fe_2O_3$, as Mapico Red $Fe_2O_3$, No. 110–2 | 41.5 |

The calcine is ground, dried, and screened. The screened calcine is recalcined for about one hour in air at about 900° C. The recalcined batch is reground and about 3 weight percent of a suitable binder is added. The recalcined batch with binder added is screened through an 80 mesh screen. The recalcined batch is then pressed into toroids. The pressed toroids are then sintered for about 10 hours in air at about 1150° C. The sintered toroids are cooled to about 1060° C. annealed for about two hours in dry prepurified nitrogen, and then cooled to room temperature in the nitrogen atmosphere.

Figure 1:
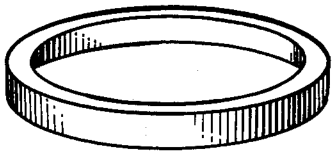
FIGURE 1 is a magnetic core of the invention in the shape of a toroid.

FIGURE 1 illustrates a toroid prepared according to the example which comprises a shaped magnetic core body consisting essentially of sintered spinel crystals. The characteristics of the core of the example are tabulated in the table below as item 1.

Figure 2:
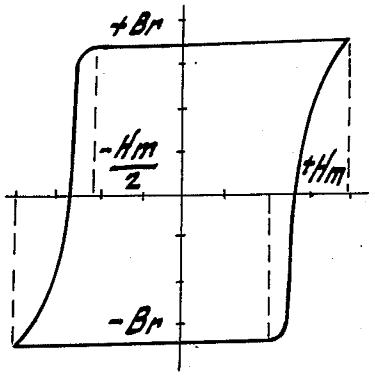
FIGURE 2 is a typical hysteresis loop for one of the mixed ferrospinel bodies herein.

A typical hysteresis loop for toroids prepared according to the example are illustrated in FIGURE 2. A typical fired toroid has about the following dimensions:

| | |
|---|---|
| Outside diameter | 0.080" |
| Inside diameter | 0.050" |
| Thickness | 0.025" |

The basic operation of a core may be explained in terms of the hysteresis loop shown in FIGURE 2. Let the $-B_r$ flux state be defined as "1" and the $+B_r$ flux state be defined as "0."

If a current pulse ($I_m$) of sufficient amplitude and appropriate polarity is applied to a core to provide a magnetizing force of $-H_m$, the pulse will leave the core in the $-B_r$ state and write a "1." With the core in the "1" state, application of a pulse of appropriate polarity and sufficient amplitude to provide a magnetizing force of $+H_m$ will switch the core to its "0" state. A change in state (magnetization) of the core will cause a large change in flux and, consequently, a high output voltage. This large output voltage is the read "1" output signal. Because the core is set to the "0" state when a read "1" output signal is produced, reading a "1" writes a "0." If another $+H_m$ pulse of the same amplitude as the original $+H_m$ pulse is applied to the core which is now in its "0" state, the core will produce a small change in flux and, consequently, a low output voltage. This low output voltage is the read "0" output signal.

To be suitable for use in coincident-current applications, a core must have magnetic properties such that when the core is in either the "1" or the "0" state, the core will not reverse its flux when a magneto-motive force equal to one half the pulse required to switch the core $$\left(\frac{+H_m}{2} \text{ or } \frac{-H_m}{2}\right)$$

is applied. In addition, there should be little change in flux and very low output voltage during the excursion of the flux. Thus, if a series of $$\frac{+H_m}{2}$$

pulses is applied, slight degradation of the $-B_r$ state should occur only with the first few pulses, after which no further change should occur. This state is called the disturbed "1" ($dV_1$). Conversely, the application of $$\frac{-H_m}{2}$$

pulses to a core in the $+B_r$ state produces a disturbed "0" state ($dV_z$).

Figure 3:
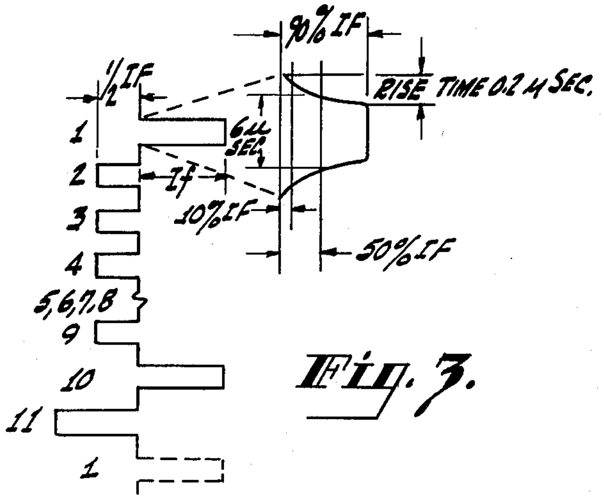
FIGURE 3 is a magnetizing pulse program simulating operation of a typical ferrospinel body herein in a coincident current magnetic memory device.

The pulse program shown in FIGURE 3 produces the following sequence of events: Pulse No. 1 "reads" an undisturbed "1" output signal ($uV_1$), which was written by pulse No. 11 of the previous cycle. When pulse No. 1 is completed, the core is left in its "0" state. Pulses No. 2 through No. 9 are partial pulses ($I_d$) which disturb the "0" state, but do not switch the core. Pulse No. 10 returns the core to its undisturbed "0" state and reads the disturbed "0" output signal ($dV_z$). Pulse No. 11 switches the core and "writes" a "1." By omitting pulse No. 10 from the program, the flux change caused by pulse No. 11 produces a disturbed "1" ($dV_1$) output signal.

In the table, $T_p$ is the peaking time, $T_s$ is the switching time, T is the firing temperature of the core in ° C., $R_s$ is the squareness ratio, $H_c$ is the saturation coercive force and $B_s$ is the saturation flux density. All times are in microseconds, $H_c$ is in oersteds and $B_s$ is in gausses. All of the data of the table was taken with a current pulse rise time of 0.2 microsecond and a pulse duration of 6 microseconds.

The invention herein is based on the discovery that magnetic cores of certain magnesium-manganese-zinc spinels containing both between 9 to 20 mol percent zinc oxide and also 2 to 10 mol percent nickel oxide possess unusual and unexpectedly improved magnetic properties, particularly useful for high drive applications in magnetic memories.

The magnetic cores herein are limited to the following compositional ranges in mol percent:

| | |
|---|---|
| MgO | 15 to 25 |
| MnO | 10 to 40 |
| ZnO | 9 to 20 |
| NiO | 2 to 10 |
| $Fe_2O_3$ | 35 to 45 |

The raw batch may be prepared of the foregoing oxides or of compounds which yield the foregoing oxides by chemical reaction during calcining or firing of the batch. A high degree of purity is desirable, preferably the "chemically pure" grade of chemicals.

In the example, the steps of mixing, calcining at 525° C., grinding, drying, and screening are designed to provide an intimate mixture of the ingredients and for the removal of the gases, water, and inorganic matter. These steps are not critical. Any procedure which provides a dry, intimate mixture of the ingredients is satisfactory.

In the example, recalcining at about 900° C. is important. The recalcining temperature may be between 900° C. and 1100° C., but preferably at the lower end of the range. The recalcining time is not critical, although shorter times should be used with higher recalcining temperatures. Air is the preferred recalcining atmosphere although other atmospheres having oxidizing characteristics similar to air at the recalcining temperature may also be used.

In the example, regrinding the calcine, addition of a binder, rescreening, and pressing are not critical to the magnetic properties of the final product. However, a proper selection should be made to obtain the desired shape and size of product with a minimum of distortion. Besides toroids, other shapes such as magnetic memory plates and transfluxor cores may be prepared. See a description of processes in G. S. Hipskind and T. Q. Dziemianowicz, "Processing and Testing Rectangular Loop Cores," RCA Engineer, volume 2, No. 6, April-May 1957, pages 9 to 13.

In the example, the sintering temperature should be between 1100° C. and 1300° C. The zinc oxide volatilizes excessively above 1300° C. destroying the compositional proportions. Below 1100° C., the composition remains insufficiently reacted. The sintering time is not critical. Any sintering time sufficient for complete reaction is adequate. One to twenty hours, preferably ten hours have been found to be a convenient firing time.

The sintering atmosphere is of great importance. In the example, the toroids are fired at about 1150° C. in air, and then annealed for two hours in dry prepurified nitrogen at about 1060° C. By this procedure the sintering atmosphere is not critical. However, during the annealing, the atmosphere is critical since it determines the relative oxidation states of the constituents of the compositions. It has been found that a neutral atmosphere such as is provided with nitrogen, argon, helium or mixtures of various gases, is necessary. With such atmospheres, the annealing temperature may be selected from the range between 1025° C. and 1100° C. The annealing time is not critical, one to four hours, preferably two hours, being a convenient time.

Alternative to sintering and annealing in one firing, the bodies herein may be prepared by sintering in air, cooling to room temperature and then refiring in a neutral atmosphere, and finally cooling again to room temperature. By this procedure magnetic cores with similar characteristics are produced.

In the table, items 2, 3, 4 are additional examples of cores prepared according to the method of the example but with different compositions and firing temperatures as indicated. Item 5 is a core similar to that of item 4 except that zinc oxide and nickel oxide have been omitted and the proportions of MgO and MnO have been correspondingly increased. Note the lower values of $B_s$ and $uV$ for the core of item 5.

There have been described high drive ferrospinel bodies having substantially rectangular hysteresis characteristics which provide an optimum output voltage and a relatively fast switching time. There have also been described methods for preparing the ferrospinel bodies of the invention.

*Table*

| Item | 1 | 2 | 3 | 4 | 5 |
|---|---|---|---|---|---|
| MgO (mol percent) | 19.8 | 16.5 | 20 | 24.3 | 38 |
| MnO (mol percent) | 16.2 | 13.4 | 30 | 19.8 | 22 |
| ZnO (mol percent) | 15.0 | 18.8 | 10 | 9.92 | 0 |
| NiO (mol percent) | 7.5 | 9.4 | 5 | 4.99 | 0 |
| $Fe_2O_3$ (mol percent) | 41.5 | 41.9 | 35 | 40.99 | 40 |
| T. (° C.) | 1,150 | 1,165 | 1,230 | 1,170 | 1,250 |
| $I_m$ (ma.) | 740 | 600 | 740 | 740 | 740 |
| $I_d$ (ma.) | 370 | 300 | 370 | 370 | 370 |
| $uV_1$ (mv.) | 260 | 240 | 120 | 130 | 100 |
| $dV_z$ (mv.) | 24 | 30 | 25 | 20 | 20 |
| $T_p$ (μsec.) | 0.38 | 0.39 | .49 | .60 | .60 |
| $T_s$ (μsec.) | 0.77 | 0.79 | 1.03 | 1.20 | 1.25 |
| $R_s$ | 0.89 | 0.86 | 0.84 | 0.845 | 0.82 |
| $Hc_s$ (oersteds) | 1.22 | 1.04 | 1.39 | 1.4 | 1.3 |
| $B_s$ (gauss) | 2,460 | 2,310 | 2,350 | 2,200 | 1,900 |

At the left is indicated the composition in mol percent, firing temperature and characteristics of each item. Each column indicates each of five different cores identified by item number.

What is claimed is:

1. A ferromagnetic ferrite body having a substantially rectangular magnetic hysteresis loop formed by firing a mixture of magnesium, manganese, zinc, nickel, and iron oxides in the proportions of about:

| | Mol percent |
|---|---|
| MgO | 15 to 25 |
| MnO | 10 to 40 |
| ZnO | 9 to 20 |
| NiO | 2 to 10 |
| $Fe_2O_3$ | 35 to 45 |

2. A ferromagnetic ferrite body having a substantially rectangular magnetic hysteresis loop formed by firing a mixture of magnesium, manganese, zinc, nickel, and iron oxides in the proportions of about:

| | Mol percent |
|---|---|
| MgO | 19.8 |
| MnO | 16.2 |
| ZnO | 15.0 |
| NiO | 7.5 |
| $Fe_2O_3$ | 41.5 |

3. A ferromagnetic ferrite body having a substantially rectangular magnetic hysteresis loop formed by firing a mixture of magnesium, manganese, zinc, nickel, and iron oxides in the proportions of about:

| | Mol percent |
|---|---|
| MgO | 16.5 |
| MnO | 13.4 |
| ZnO | 18.8 |
| NiO | 9.4 |
| $Fe_2O_3$ | 41.9 |

4. A ferromagnetic ferrite body having a substantially rectangular magnetic hysteresis loop formed by firing a mixture of magnesium, manganese, zinc, nickel, and iron oxides in the proportions of about:

| | Mol percent |
|---|---|
| MgO | 20 |
| MnO | 30 |
| ZnO | 10 |
| NiO | 5 |
| $Fe_2O_3$ | 35 |

5. A ferromagnetic ferrite body having a substantially rectangular magnetic hysteresis loop formed by firing a mixture of magnesium, manganese, zinc, nickel, and iron oxides in the proportions of about:

| | Mol percent |
|---|---|
| MgO | 24.3 |
| MnO | 19.8 |
| ZnO | 9.92 |
| NiO | 4.99 |
| $Fe_2O_3$ | 40.99 |

6. A process for preparing a mixed ferrospinel having a substantially rectangular magnetic hysteresis loop comprising calcining an intimate physical mixture consisting essentially of:

| | Mol percent |
|---|---|
| MgO | 15 to 25 |
| MnO | 10 to 40 |
| ZnO | 9 to 20 |
| NiO | 2 to 10 |
| $Fe_2O_3$ | 35 to 45 |

compacting said calcine to a coherent body, and then sintering said compacted body at about 1100° to 1300° C.

7. A process for preparing a mixed ferrospinel having a substantially rectangular magnetic hysteresis loop comprising calcining at about 900° to 1100° C. and intimate physical mixture consisting essentially of:

| | Mol percent |
|---|---|
| MgO | 15 to 25 |
| MnO | 10 to 40 |
| ZnO | 9 to 20 |
| NiO | 2 to 10 |
| $Fe_2O_3$ | 35 to 45 |

compacting said calcine to a coherent body, sintering said compacted body at about 1100° to 1300° C. in air, annealing said sintered body at about 1025° to 1150° C. in a neutral atmosphere.

8. The process of claim 7 wherein said neutral atmosphere is nitrogen.

9. A process for preparing a mixed ferrospinel having a substantially rectangular magnetic hysteresis loop comprising calcining at about 900° to 1100° C. an intimate physical mixture consisting essentially of:

| | Mol percent |
|---|---|
| MgO | 15 to 25 |
| MnO | 10 to 40 |
| ZnO | 9 to 20 |
| NiO | 2 to 10 |
| $Fe_2O_3$ | 35 to 45 |

compacting said calcine to a coherent body, sintering said compacted body at about 1100° to 1300° C. in air, cooling said sintered body to room temperature and then refiring said body in a neutral atmosphere.

10. The process of claim 9 wherein said neutral atmosphere is nitrogen.

References Cited in the file of this patent

UNITED STATES PATENTS

| | | |
|---|---|---|
| 2,535,025 | Albers-Schoenberg | Dec. 26, 1950 |
| 2,565,111 | Albers-Schoenberg | Aug. 21, 1951 |
| 2,981,689 | Albers-Schoenberg | Apr. 25, 1961 |

FOREIGN PATENTS

| | | |
|---|---|---|
| 155,546 | Australia | Mar. 5, 1954 |
| 158,857 | Australia | Sept. 15, 1954 |
| 793,551 | Great Britain | Apr. 16, 1958 |